2,707,970

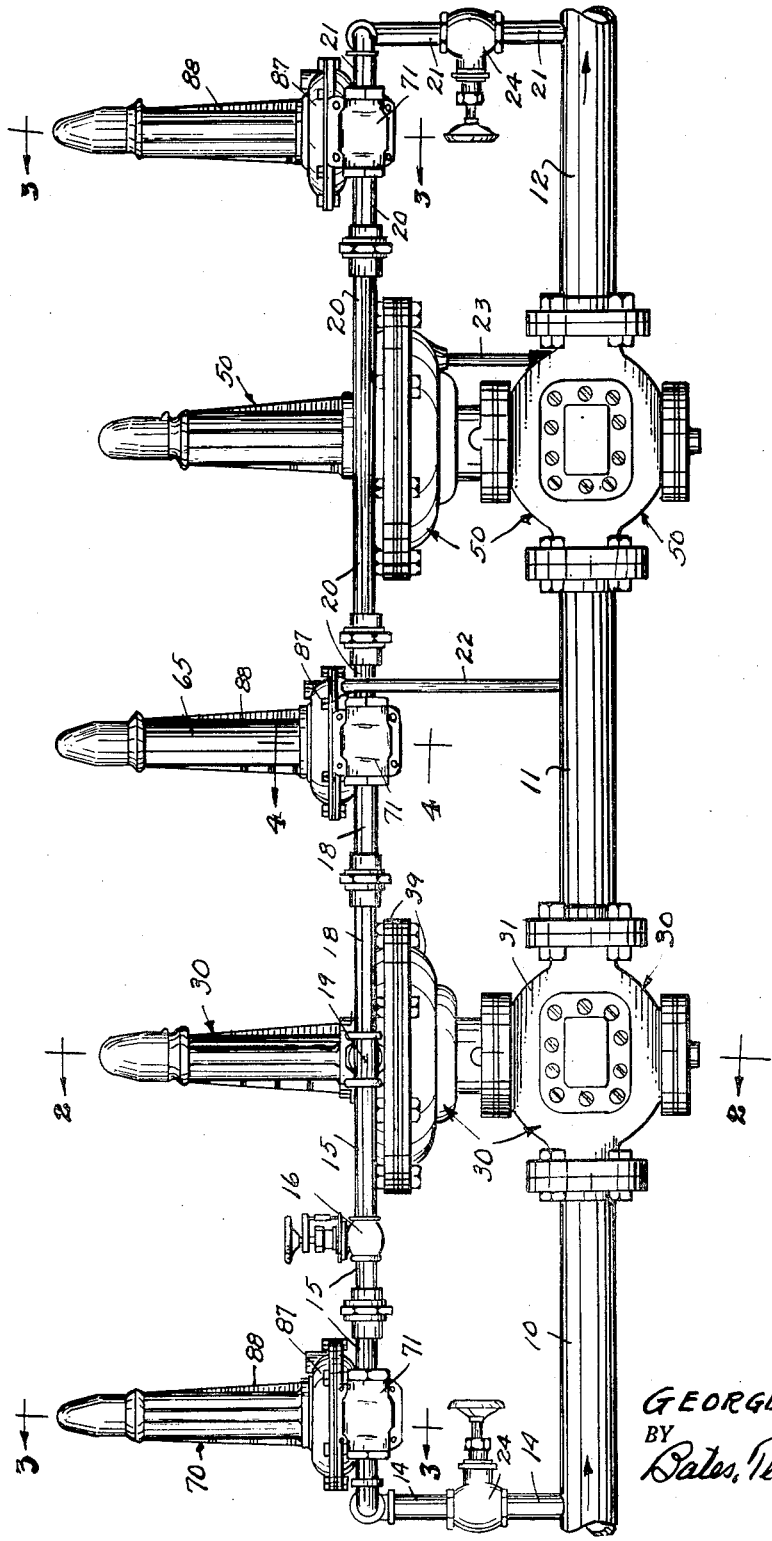

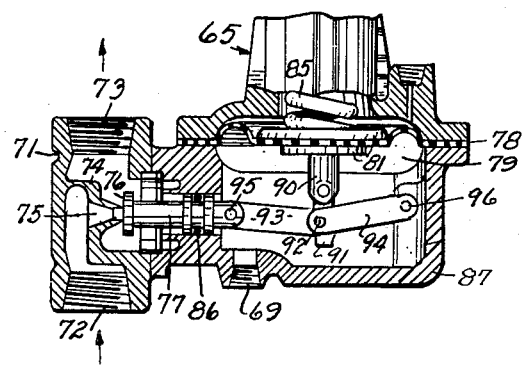
Fig-4
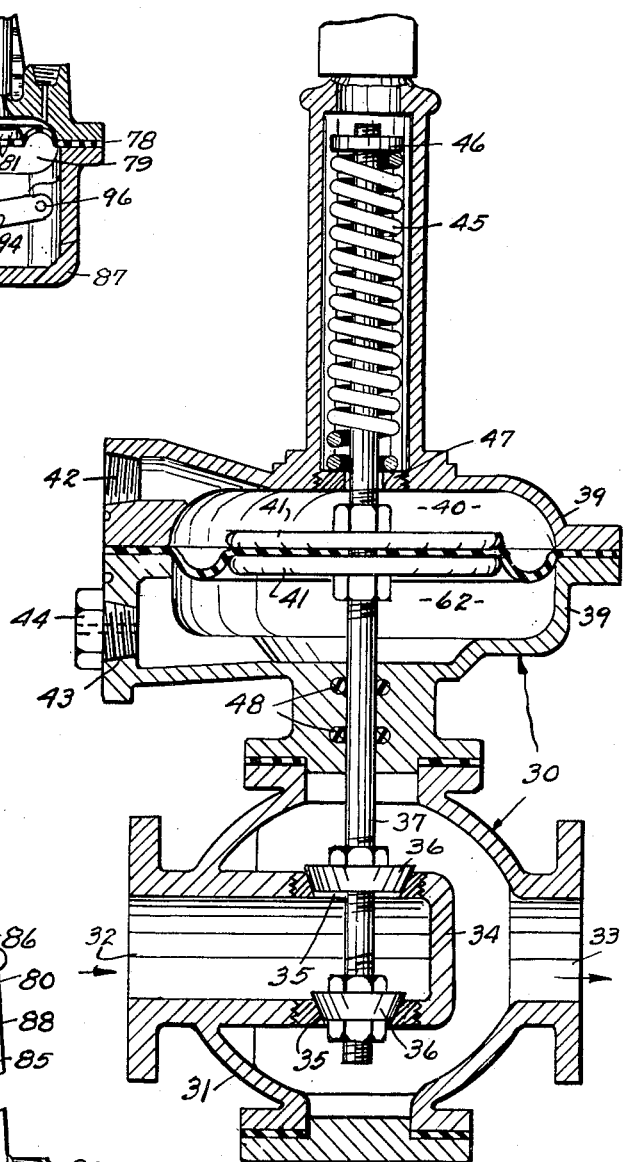
Fig-3
Fig-2
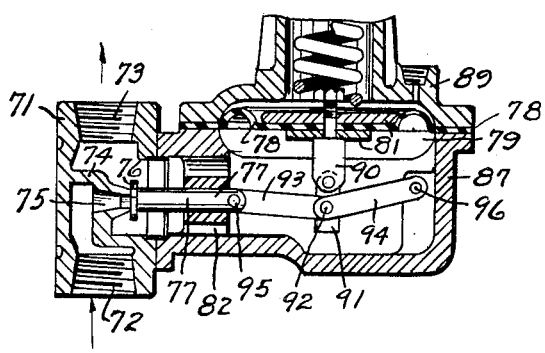
INVENTOR.
GEORGE C. HUGHES
BY
Bates, Teare, & McBean
ATTORNEYS

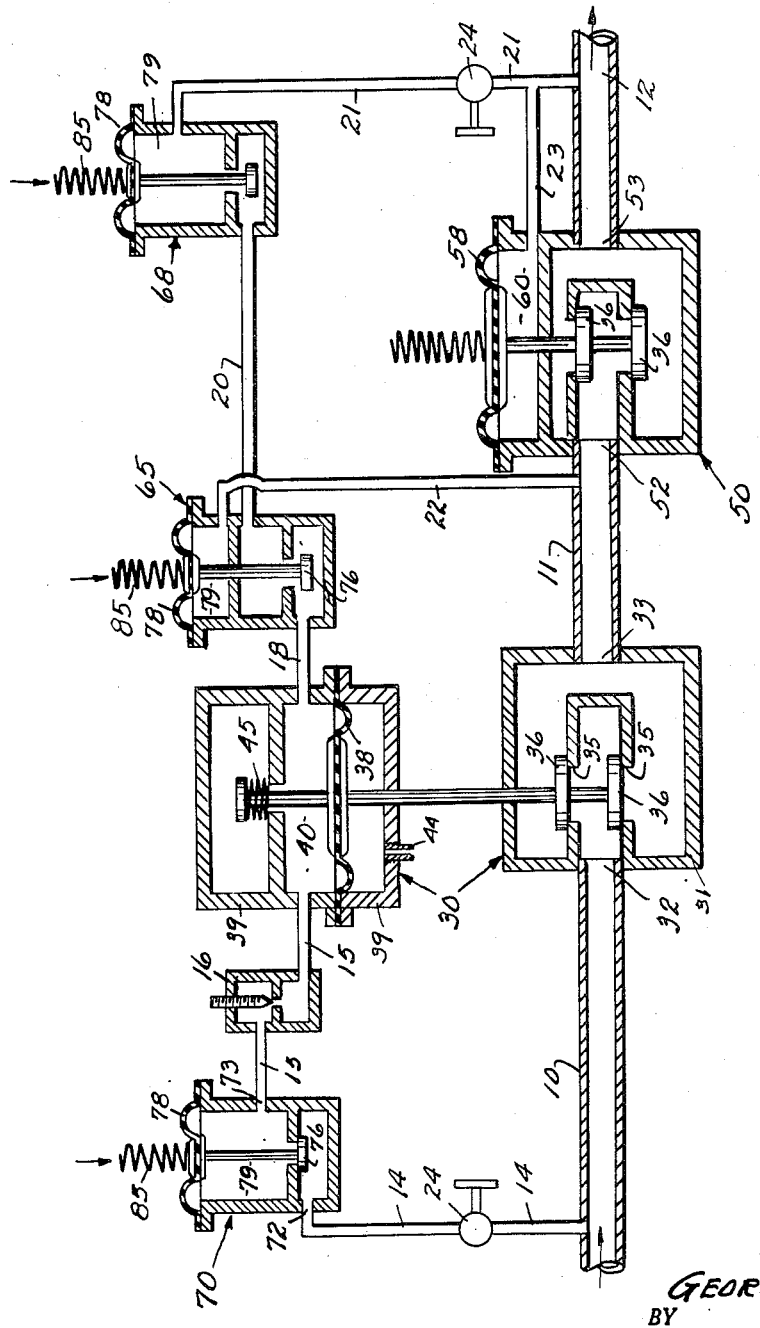

FLUID PRESSURE DISTRIBUTING SYSTEM

George C. Hughes, Anderson, Ind., assignor to Reynolds Gas Regulator Company, Anderson, Ind., a corporation of Indiana Application November 24, 1952, Serial No. 322,253

2 Claims. (Cl. 137—489)

This invention relates to improvements in or relating to fluid pressure distributing systems, and especially to improvements in systems for distributing the flow of gas from a high pressure supply main to a low pressure service main so as to maintain a predetermined pressure in such a manner as to increase the safety of the system. This, therefore, is the general object of the present invention.

The present invention is particularly useful in gas or fluid distributing systems wherein the gas passes from a high pressure supply main to a low pressure service main through a valve, the operation of which is controlled by the downstream pressure in the service main. Such valves are commonly known as fluid pressure regulators, and generally include a valve member which is opened and closed by a flexible diaphragm, at least one side of which is responsive to a controlling fluid pressure derived from some part of the system, as for instance the pressure in the service or low pressure main. Such diaphragm may be biased by fluid pressure means or by a resilient member such as a spring.

In gas distributing systems, particularly those used by public utilities for the distribution of gas in municipalities, it is highly important that the pressure in the service main never rise above a predetermined maximum, or fall below a predetermined minimum despite wide variations in the rate of flow of the gas through the system. To insure against an undesired pressure rise in the service main, the pressure regulator is designed so that when there is no demand for a flow of gas through the service main, the regulator will "lock up" or in other words close and stop all flow of gas from the supply main to the service main. Under such condition even a small seepage of gas through the regulator, in time, would raise the pressure of the service main to that of the high pressure supply main. The gas flowing through such a system generally contains a certain amount of impurities including small solid particles, as for instance, sand, pipe scale, and the like. Accordingly, when the regulating valve moves toward its closed position such particles may be trapped between its valve member and seat, thereby preventing a tight closing of the valve and resulting in seepage of gas from the high pressure main to the low pressure main. As such a condition is exceedingly dangerous, various attempts have been made towards its elimination. One such attempt comprises the use of two pressure regulators, generally identical in structure. Such regulators are connected in series between the high and low pressure mains so that the gas flows first through one regulator and then through the other regulator to reach the low pressure main. Both regulators are controlled by the downstream pressure in the low service main. This use of two regulators is predicated upon the assumption that when one regulator fails to close tightly, due to trapped solid particles, the other regulator will close tightly thereby avoiding dangerous conditions due to seepage sometimes taken place. It has long been believed that this has been due to the trapping of solids between the valve and valve seat of both regulators simultaneously. However, I have found that this assumption is erroneous. Further I have found that this condition actually results from the trapping of solids in one regulator, namely, the regulator nearest to supply or high pressure main and a mechanical failure of the other regulator.

In the past the two regulators have been arranged to provide the same outlet pressure and each has been controlled by the downstream pressure in the low pressure main. Hence under normal operating conditions the regulator adjacent the supply or high pressure main serves to perform all pressure regulating and reducing functions of the system, and, its outlet pressure is the same as the pressure in the low service main, while the inlet and outlet pressures of the second regulator are always the same. Thus, under normal operating conditions the second regulator is idle and does not perform any useful function.

Ordinarily prolonged periods of time elapse before there is a seepage of gas through the regulating system due to the entrapment of solids in one of the regulators. I have found the operating parts of the idle regulator become coated during such prolonged period of time by chemical reactions, oxidization, corrosion, as well as by the collection of impurities deposited thereon by the gas. Such coating accumulates to such an extent as to cause a mechanical failure of the regulator by preventing closing whereupon the pressure in the service main rises and soon becomes dangerous. The constant actuation of the active regulator prevents the coating thereon from interfering with its normal operation. Accordingly, when the active regulator fails to close tightly due to entrapped particles the second regulator is useless.

According to the present invention, the disadvantages of the prior system are overcome by connecting two pressure regulators in series between the high and low pressure mains and controlling the regulator nearest the high pressure main by the pressure of gas flowing from one regulator to the other so that a higher pressure is maintained intermediate the two regulators than the pressure desired in the low pressure main. The second regulator is then made responsive to the downstream pressure in the low pressure main and is arranged to reduce the intermediate pressure to that desired in the low pressure main. For instance, when it is desired to reduce a high pressure of fifty pounds (per square inch) to a low service main pressure of eight inches (as measured by water column), the first regulator is set to reduce the pressure from fifty to six pounds and the second regulator is set to reduce the six pound pressure to the desired low pressure of eight inches. The first regulator is controlled by the pressure intermediate the two regulators, and the second by the downstream pressure in the low pressure main. Accordingly, during normal operation of the system both regulators function at all times. The constant operation of both regulators prevents such coating of the operating parts of either regulator as would cause a mechanical failure thereof. The regulators are so designed that the second regulator is capable of reducing an inlet pressure of fifty pounds to the desired low pressure. Accordingly, should there be a failure of the first regulator, due to the entrapment of solid particles between its valve member, the second regulator would function to maintain the desired low pressure in the service main. In some instances such systems avoid the disadvantages of the systems used in the past, because were the entrapment to occur only in the second regulator the seepage to the service or low pressure main would not raise the pressure in the service main over six pounds and such a pressure increase would be considered of a relatively minor importance.

In some distributing systems an increase of pressure in the low pressure main to six pounds would create an exceedingly dangerous condition. Accordingly the present invention also provides a system wherein a failure of the second regulator resulting in a relatively small increase of pressure in the low pressure main above the desired pressure will cause the first regulator to become responsive to the pressure in the low pressure main and act to reduce the high pressure to the desired in the low pressure main. For instance, in a system where the first regulator normally acts to reduce a fifty pound supply pressure to six pound intermediate pressure, which in turn is reduced by the second regulator to eight inches, a failure of the second regulator to perform its reducing function resulting in a pressure increase in the low pressure main to ten inches, the arrangement would be such that the first regulator would be conditioned immediately to reduce the fifty pound supply line pressure to a ten inch pressure. Accordingly, the failure of the second regulator due to the entrapment of solid particles will not materially affect the pressure in the low pressure main. Further the system of the present invention is so arranged that when a demand for gas in a system causes the second regulator to open, freeing the entrapped particles, the system will immediately function in its normal manner. To further safeguard the system, the present invention contemplates the closing of the first regulator by pressure in excess of its outlet pressure. For instance, in the examples above mentioned the closing movement of the first regulator may be accomplished by a fluid pressure of twenty-five pounds taken from the high pressure line rendered effective in response to the intermediate pressure. These therefore are the more specific objects of the present invention.

Other objects and advantages of the invention will become more apparent from the following description, reference being made to the accompanying drawings which illustrate a fluid distributing system in accord with the present invention, and in which:

Fig. 1 is an elevational view of the improved pressure distributing and regulating system;

Fig. 2 is a vertical section through a fluid pressure regulator adapted for use as one of the main regulating valves, the upper portion of which has been rotated approximately 90° about a vertical axis from the position illustrated in Fig. 1 to simplify the illustration of this valve, the plane of the section being otherwise indicated by the lines 2—2 on Fig. 1;

Fig. 3 is a vertical section through an auxiliary regulator used in the control system, the lefthand portion thereof being turned 90° about a horizontal axis from that shown in Fig. 1 of the valve mechanism, the plane of the section being otherwise taken along the line 3—3 of Fig. 1;

Fig. 4 is a fragmentary section similar to Fig. 3 taken through another auxiliary or control regulator, the plane of the section being indicated by the line 4—4 on Fig. 1; the left hand portion of the figure shown as being rotated 90° about a horizontal axis to simplify the illustration of the structure; and Fig. 5 is a diagram illustrating the improved distributing system.

Referring now to the drawings in detail, particularly to Figs. 1 to 5, there is shown a high pressure or supply main 10 which is connected with the inlet 32 of a main pressure regulating valve generally indicated at 30. The outlet 33 of the valve 30 is connected by a conduit or intermediate main 11 with the inlet 52 of a supplemental main regulating valve 50, the outlet 53 of which is connected with a low pressure or service main 12. An auxiliary pressure regulator 70 is shown as having its inlet 72 connected with the high pressure main 10 by a conduit 14 and its outlet 73 connected by a conduit 15 with a pressure chamber 40 which is formed in a casing 39 above a pressure responsive diaphragm 38 which controls the operation of the main valve 30. The arrangement is such that pressure in the chamber 40 tends to move the valve member 36 of the main valve into a position to close its valve port 35, and stop the flow of fluid through the main valve. A spring 45 is provided to bias the diaphragm 38 and move the valve 36 to an open position. The rate of flow of fluid from the auxiliary regulator 70 to the diaphragm chamber 40 is controlled by a needle valve 16. The pressure in the chamber 40 is controlled by an auxiliary regulator 65. This regulator has a flexible pressure responsive diaphragm 78 which controls the position of its valve member 76, and is responsive to the pressure in the intermediate main 11. The arrangement is such that the auxiliary regulator 65 is normally biased toward an open position by a spring 76 and is moved toward its closed position by the fluid pressure in the intermediate main 11 which is connected with a pressure chamber 79 beneath the diaphragm 78 by a conduit 22. The auxiliary regulator 65 has its inlet connected by a conduit 18 with the pressure chamber 40 of the main regulator 30, and its outlet connected by a conduit 20 with the inlet of a normally open auxiliary regulator 68. The outlet of the regulator 68 is connected by a conduit 21 with the low pressure main 12. The second main valve 50 is provided with a flexible pressure responsive diaphragm 58, the lower face of which forms the top wall of a pressure chamber 60 which is connected by a conduit 23 with the low pressure main.

If desired, the connection between the conduit 21 and 23, and the low pressure main 12 may be at a point remote from the regulating valve 50 so that the system will be responsive to pressure in such main a considerable distance downstream from the control mechanism itself.

Many types of regulating valves may be used in connection with the present system. Fig. 1 illustrates one type of main regulating valve which is well adapted for use as the first main regulating valve 30. Such valve includes a hollow valve body 31 having inlet and outlet openings 32 and 33 which are separated by a partition wall 34. This wall has a pair of aligned valve port openings 35, through which flow of fluid is controlled by a respective valve member 36. Such members are carried by a rod 37 which extends upward through the valve body 31 into a surmounting casing 39. Suitable packing rings 48 are provided to prevent seepage of gas from the body 31 into the casing 48 along the valve rod 37.

The casing 39 is separated into upper and lower chambers 40 and 62 by the flexible pressure responsive diaphragm 38 which extends transversely across the casing being conveniently held in position by being clamped between upper and lower sections which form the casing. The central portion of the diaphragm 38 is clamped between a pair of discs 41 which are secured to the valve rod 47 so that movement of the diaphragm will be transmitted directly to the valve members 36. The conduits 15 and 18 which connect the chamber 40 with the auxiliary regulators 70 and 65 may be connected, as shown in Fig. 1, to opposite ends of a pipe tee 19, the other end of which is connected by a short conduit (not shown) with a threaded inlet opening 42 of chamber 40. The lower chamber 62 is also provided with an opening 43 which may be closed by a vent plug 44 so that the lower chamber 62 will be subjected to atmospherical pressure at all times.

The main diaphragm 38 is biased or pre-loaded to move the valve members 36 to an open position by the adjustable spring 45. As shown, this spring encircles the upper end of the valve rod 37 which extends some distance above the diaphragm 38. The spring is interposed between an adjustable nut 46 threadingly mounted on the upper end of the rod 37 and a partition wall 47 of the casing 39. The arrangement is such that this spring normally acts to raise the valve rod 37 against the fluid pressure in the chamber 40.

The auxiliary regulators 70 and 68 are substantially identical. A suitable regulator is illustrated in Fig. 3.

Such regulator comprises a valve body 71 having an inlet 72 and an outlet 73 which are separated by a partition wall 74. This wall is provided with a valve port opening 75, the flow of fluid through which is controlled by a valve member 76 mounted on one end of a stem 77 which is slidably mounted in the valve body 71 for movement to and from such port. The body 71 is secured to a diaphragm casing 87 to the main valve body by any well known means. As shown in Fig. 3, the valve body has been rotated relative to the diaphragm casing approximately 90° about a horizontal axis from the position shown in Fig. 1. This has been done to simplify illustration of the regulator. As shown in Fig. 3 the diaphragm casing 87 extends some distance to the right of the valve body 71 and is provided with an enlarged chamber 79, the upper end of which is closed by the flexible pressure responsive diaphragm 78. This diaphragm is held in place by a hollow cap-like structure 89. The central portion of the diaphragm 78 is clamped between two rigid discs 81 which are provided with a downwardly extending lug 90. This lug is connected by a link 91 with a pivot pin 92 which interconnects a pair of toggle links 93 and 94. The link 93 is connected between the pivot 92 and a pivot 95 formed on the inner end of the valve stem 77. The link 94 is connected between the pivot 92 and a fixed pivot 96 carried by the casing 87. Accordingly, vertical movement of the diaphragm will move the valve member 76 to and from its valve port 75. Suitable communicating passageways 82 between the body 71 and the diaphragm casing 87 place the chamber 79 below the diaphragm 78 in communication in the fluid pressure at the outlet side of the valve body. The diaphragm 78 is biased by the spring 85 housed in an upwardly extending portion 88 of the cap 89. This spring extends between a washer 80 mounted in the upper end of the extension 88 and the upper diaphragm supporting disc 81. An adjusting screw 86 threadingly mounted in the upper end of the extension 88 serves to regulate the pressure of spring on the diaphragm.

The auxiliary regulator 65 is illustrated in Fig. 4. As this regulator is similar to that of Fig. 3 identical reference characters have been used for corresponding parts. Comparison of the structures of Figs. 3 and 4 will disclose that the regulator 65 differs from the regulators 70 and 68 in that the outlet opening 73 and pressure chamber 79 are out of communication with each other, the passageways 82 being omitted in the regulator 65. Packing rings 86 encircle the valve stem 77 to prevent passage of fluid through the valve stem opening of the regulator 65. Further this regulator differs from the regulators 68 and 70 in that the diaphragm housing is provided with a threaded opening 69 to receive the conduit 22 and thereby place its pressure chamber 79 in communication with the intermediate main 11.

The supplemental main valve 50 may be constructed similar to the valve 30. However, as indicated in Fig. 5 the chamber 60, below the diaphragm 58 of the valve 50 is the pressure chamber, and the spring 45 acts directly on the diaphragm tending to move its valve members 36 to an open position. These valve members and their associated ports are inverted relative to the corresponding parts shown in Fig. 2. The vent plug 44 is applied to the upper chamber and the conduit line 23 is connected with the chamber 60.

The operation of the system for a high pressure of fifty pounds and a low pressure of eight inches will now be given. The spring 85 of the auxiliary regulator 70 is adjusted to provide a constant outlet pressure of twenty-five pounds. The spring 85 of the auxiliary regulator 68 is adjusted so that its valve member will be wide open when eight inches pressure exists at its outlet and will close as such pressure is increased to ten inches. The needle valve 16 and the spring 85 of the auxiliary regulator 65 are adjusted to permit a restricted flow of gas through from the pressure chamber 40 of the main valve 30 such as will maintain the gas pressure against the diaphragm 38 equal to the action of the spring 45. The valve 76 of the regulator 65 accordingly will be in an intermediate open position, but will move toward its closed position to further restrict the flow of gas from the chamber 40 as the pressure in the intermediate main 11 reaches six pounds and will move further away from its seat to permit a greater flow from the chamber 40 when the pressure in the intermediate main drops. The spring 45 of the supplemental main regulator 50 is adjusted to restrict the pressure in the low pressure line to eight inches.

Under the conditions above mentioned a demand for gas made on the service main 12 decreases the pressure in gas made on the service main 12 decreases the pressure in both this main and the chamber 60 of the supplemental regulator 50. This causes the valve of this regulator to open to permit a greater flow through the regulator 50 thereby decreasing the pressure in both the intermediate main 11 and the pressure chamber 79 of the auxiliary regulator 65. The biasing spring 85 of this auxiliary regulator 65 then moves its valve 76 toward an open position, permitting a greater rate of flow of gas from the chamber 40 of the main regulator 30. Whereupon the gas pressure in the chamber 40, which acts on the diaphragm 38 decreases, and the force of the spring 45 opens the main valve 30 wider to permit a greater flow through such valve which results in the restoration of the pressure in the intermediate main to six pounds and the pressure in the service line to eight inches. The restoration of these pressures balances the pressures on the diaphragms 38 and 58 and they retain their respective valves open to compensate for the increased flow demand. The supplemental regulator 65 then reassumes its normal position and again restricts the rate of flow through the auxiliary system to the predetermined normal rate, thus maintaining a balanced condition on the diaphragm 38.

When the demand on the service main 12 decreases, the pressure in such main increases a small amount say one inch. This increases the pressure in the pressure chamber 60 of the regulator 50 causing its valve to move toward a closed position. This restricts the flow through the regulator 50 and causes an increase in the pressure in the intermediate main and the pressure chamber of the regulator 65 to a point above six pounds. Such increase tends to close the regulator 65. This further restricts the rate of flow of gas from the main valve pressure chamber 40 thereby increasing the pressure in this chamber. This pressure increase causes the spring 45 to overbalance the gas pressure on the diaphragm 38 and results in the moving of the main valve toward its closed position reducing the rate of flow from the main 10 to the main 11. When the pressures are again restored in the mains 11 and 12, the pressures on the diaphragms 38 and 60 are again balanced and these valves remain open to compensate for the reduced flow through the mains. However, should the demand for gas on the service main 12 stop, the pressure in such main would remain high and both valves 30 and 50 normally would close tightly and remain closed until a demand was created.

From the above operation it will be seen that both main valves function at all times during the operation of the system.

Should the movement of the valve member 36 of the main valve 30 to a closed position, because of the lack of demand for gas, result in the trapping of solid particles between such valve and its seat, seepage of gas from the main 10 to the main 11 would result. Such seepage likewise might take place because of corrosion of the valve or its seat. Ultimately this seepage would result in an increase of pressure in the intermediate main to fifty pounds. However, the regulator 50 would remain closed and dangerous conditions would be avoided.

Should the entrapment of particles occur in the regulator 50, the resulting seepage ultimately would raise the service line pressure to six pounds were it not for the auxiliary regulator 68. However, when, under these conditions, the service line pressure reaches ten inches the pressure in the diaphragm chamber 79 of the auxiliary regulator 68 is likewise raised. This causes this regulator to move toward a closed position and results in the obstructing of the flow of gas from the diaphragm chamber 40 of the valve 30. This results in increasing the pressure in the chamber 40 thereby moving the valve 36 toward a closed position regardless of the reduction in pressure in the chamber 79 of the auxiliary regulator 65, which results from the reduction of pressure in the intermediate main 11 due to the seepage of gas through the regulator 50. The regulator 30 is thus placed directly under the control of the auxiliary regulator 68 with the result that the pressure in the intermediate main cannot be increased beyond ten inches. Accordingly, the service main pressure is limited to ten inches. In this connection the intermediate main 11 is relatively short so that its volume is small in comparison to that of the usually long service main 12 so that the volume of gas seeping through the valve 50 to reduce the pressure in the intermediate main from six pounds to ten inches has a negligible effect on the pressure in the service main.

From the above it will be seen that the improved system is exceedingly safe and may operate over long periods of time without attention.

I claim:

1. In a fluid pressure regulating system having a high pressure supply main and a low pressure service main, a pair of valves each having an inlet and an outlet together with a valve member to control the flow of fluid from its inlet to its outlet, one valve having its inlet connected with the high pressure main and its outlet with the inlet of the other valve, the outlet of such other valve being connected with the low pressure main, means to control the first-named valve member including a flexible pressure responsive diaphragm operatively connected therewith, a valve closing chamber on one side of said diaphragm, resilient means to bias said valve member toward a valve opening position, a fluid passageway between the high pressure main and said valve closing chamber, a flow restricting valve to control the rate of flow of fluid through said passageway, a fluid discharge leading from said chamber, and means responsive to the fluid pressure at the outlet side of the first valve member to control the flow of fluid through the closing chamber and including an auxiliary regulator having a valve body provided with an inlet and an outlet separated by a partition wall having a valve port opening extending therethrough, a valve member movably mounted in said body to control the flow of fluid through said port, a flexible pressure responsive diaphragm operatively connected to said last-named valve, a valve closing chamber on one side of said last named diaphragm, resilient means biasing said last named diaphragm to its valve opening position, a passageway connecting the discharge of the first named chamber with the inlet of the auxiliary valve body, a passageway extending between and communicating with the valve closing chamber of the auxiliary regulator and the outlet of the first named valve, a second auxiliary regulator, including a valve body having an inlet and an outlet opening, a partition wall separating said last named openings and having a valve port extending therethrough, a valve member movable to and from said last named port to control the flow of fluid therethrough, a pressure responsive flexible diaphragm operatively connected with said last named valve member, a valve closing pressure chamber at one side of said last named diaphragm, a spring biasing said last named valve member to an open position and settable to maintain the valve open until the pressure in said last named pressure chamber exceeds the pressure desired in the low pressure main by a predetermined amount, a conduit interconnected between the low pressure main and the last named valve closing chamber, said last named chamber being in communication with the outlet of the last named valve body, and a conduit extending between the outlet of the first named auxiliary regulator and the inlet of the last named auxiliary regulator.

2. A fluid pressure regulating system according to claim 1 wherein a third pressure regulator is positioned between the flow restricting valve and the high pressure main to deliver a constant pressure to the flow restricting valve regardless of fluctuations of pressure in the high pressure main, said last named regulator including a valve body having an inlet connected with the high pressure main and an outlet connected with the flow restricting valve, a valve member movably mounted in said body to control the flow of fluid from the inlet to the outlet, a flexible diaphragm operatively connected with said valve member, resilient means biasing said diaphragm toward a valve opening position, and a valve closing chamber on one side of said diaphragm and in communication with the outlet pressure of such third regulator.

References Cited in the file of this patent

UNITED STATES PATENTS

| 1,311,536 | Smoot | July 29, 1919 |
| 2,365,713 | MacLean | Dec. 26, 1944 |
| 2,370,110 | Spence | Feb. 20, 1945 |